United States Patent
Le Taillandier de Gabory et al.

(10) Patent No.: US 11,329,444 B2
(45) Date of Patent: May 10, 2022

(54) OPTICAL AMPLIFIER AND CONTROL METHOD THEREFOR

(71) Applicant: NEC Corporation, Tokyo (JP)

(72) Inventors: Emmanuel Le Taillandier de Gabory, Tokyo (JP); Shigeru Nakamura, Tokyo (JP); Shigeyuki Yanagimachi, Tokyo (JP); Keiichi Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 495 days.

(21) Appl. No.: 16/334,417

(22) PCT Filed: Sep. 20, 2016

(86) PCT No.: PCT/JP2016/004263
§ 371 (c)(1),
(2) Date: Mar. 19, 2019

(87) PCT Pub. No.: WO2018/055653
PCT Pub. Date: Mar. 29, 2018

(65) Prior Publication Data
US 2019/0221987 A1    Jul. 18, 2019

(51) Int. Cl.
*H01S 3/067* (2006.01)
*G02B 6/02* (2006.01)
(Continued)

(52) U.S. Cl.
CPC ........... *H01S 3/06737* (2013.01); *G02B 6/02* (2013.01); *H01S 3/0064* (2013.01);
(Continued)

(58) Field of Classification Search
None
See application file for complete search history.

(56) References Cited

U.S. PATENT DOCUMENTS 6,366,395 B1   4/2002  Drake et al.
6,556,345 B1 * 4/2003  Gassner ............. H04B 10/0731
                                                      359/341.4
(Continued)

FOREIGN PATENT DOCUMENTS

EP        1318621 A2    6/2003
JP   2004-363631 A     12/2004
(Continued)

OTHER PUBLICATIONS

Le Taillandierde Gabory et al. "Transmission of 256Gb/s PM-16QAM Signal through 7-Core MCF and MC-EDFA with Common Cladding and Variable Shared Core Pumping for Reduction of Power Consumption" Proceedings of European Conference on Optical Communication (ECOC2017), pp. M.1.E.2 (Year: 2017).*

(Continued)

*Primary Examiner* — Eric L Bolda

(57) ABSTRACT

To solve the problem that the power consumption of optical amplifiers is not optimized over the life time of an amplifier, the optical amplifier includes a gain medium for amplifying a plurality of optical channels, the gain medium including a plurality of cores through which the plurality of optical channels to propagate respectively and a cladding area surrounding the plurality of cores, a monitor that monitors the temperature of the optical amplifier and producing a monitoring result, a first light source that emits a first light beam to excite the cladding area, a second light source that emits a plurality of second light beams to excite each of the plurality of cores individually, and a controller that controls the first light source and the second light source based on the produced monitoring result.

12 Claims, 12 Drawing Sheets

(51) Int. Cl.
| | |
|---|---|
| *H01S 3/094* | (2006.01) |
| *H01S 3/00* | (2006.01) |
| *H01S 3/10* | (2006.01) |
| *H01S 3/0941* | (2006.01) |
| *H01S 3/16* | (2006.01) |
| *H01S 3/131* | (2006.01) |
| *H01S 3/13* | (2006.01) |

(52) U.S. Cl.
CPC .... *H01S 3/06758* (2013.01); *H01S 3/094007* (2013.01); *H01S 3/094069* (2013.01); *H01S 3/1001* (2019.08); *H01S 3/10015* (2013.01); *H01S 3/1302* (2013.01); *H01S 3/1312* (2013.01); *H01S 3/1608* (2013.01); *H01S 3/09408* (2013.01); *H01S 3/09415* (2013.01); *H01S 3/094011* (2013.01); *H01S 3/094065* (2013.01); *H01S 3/10013* (2019.08)

(56) References Cited

U.S. PATENT DOCUMENTS

| | | | |
|---|---|---|---|
| 2004/0051938 A1* | 3/2004 | Chan | H01S 3/1301 359/337.1 |
| 2005/0007656 A1* | 1/2005 | Chung | H01S 3/06758 359/337 |
| 2016/0211641 A1* | 7/2016 | Ohtani | H04J 14/0212 |
| 2016/0254637 A1 | 9/2016 | Ikoma et al. | |

FOREIGN PATENT DOCUMENTS

| | | |
|---|---|---|
| JP | 2010-171322 A | 8/2010 |
| JP | 2010-263026 A | 11/2010 |
| JP | 2015-167158 A | 9/2015 |
| JP | 5950426 B1 | 7/2016 |
| WO | 00/04613 A1 | 1/2000 |
| WO | 2010/079773 A1 | 7/2010 |

OTHER PUBLICATIONS

Extended European Search Report for EP Application No. EP16916725.1 dated Sep. 24, 2019.

Takahashi et al., "First demonstration of MC-EDFA-repeatered SDM Transmission of 40 x 128-Gbit/s PDM-QPSK signals per core over 6,160-km 7-core MCF", Optics Express, Jan. 14, 2013, vol. 21, No. 1, pp. 789-795 (total 7 pages).

Tsuchida et al., "Multicore erbium doped fiber amplifier for space division multiplexing", IEEE, 2013, TuC3.1, pp. 103-104 (total 2 pages).

Takeshima et al., "51.1-Tbit/s MCF Transmission over 2520 km Using Cladding-Pumped Seven-Core EDFAs", Journal of Lightwave Technology, Jan. 15, 2016, vol. 34, No. 2, pp. 761-767 (total 7 pages).

Ono et al., "Study on gain control of MC-EDFA by using hybrid pumping of cladding- and core-direct-pumping schemes", IEICE Technical report, OCS2014-116, OPE2014-222 (Feb. 2015), pp. 111-115.

E. Le Taillandier de Gabory et al., "Investigations on Reduction of Power Consumption of Optical Amplification with Hybrid Pumping Scheme Multicore EDFA and Minimized Number of Lighten Cores", IEICE Society Conference 2016, paper B-10-48 (total 1 page).

Abedin et al., "Seven-core erbium-doped double-clad fiber amplifier pumped simultaneously by side-coupled multimode fiber", Optics Letters, Feb. 15, 2014, vol. 39, No. 4, pp. 993-996 (total 4 pages).

Krummrich, "Efficient optical amplification for spatial division multiplexing", Proceedings of SPIE, 2012, vol. 8284, p. 82840F-1 to 82840F-7 (total 8 pages).

Miura, et. al., "Batch Multicore Amplification with Cladding-Pumped Multicore EDF", ECOC Technical Digest, 2012, Tu.4.F.1, total 3 pages.

International Search Report for PCT/JP2016/004263 dated Dec. 6, 2016 [PCT/ISA/210].

Written Opinion of the International Searching Authority for PCT/JP2016/004263 dated Dec. 6, 2016 [PCT/ISA/237].

* cited by examiner

OPTICAL AMPLIFIER AND CONTROL METHOD THEREFOR

This application is a National Stage Entry of PCT/JP2016/004263 filed on Sep. 20, 2016, the contents of all of which are incorporated herein by reference, in their entirety.

TECHNICAL FIELD

The present invention relates to optical amplifiers, control methods for controlling an optical amplifier, in particular, to an optical amplifier, a control method for amplifying an optical signal using an optical fiber.

BACKGROUND ART

In order to optimize the investment in optical fiber links, it is desirable to increase the capacity of the optical fiber links. This can be achieved by increasing the spectral efficiency (SE) of the signals transmitted on the optical fiber links.

A common way to increase the spectral efficiency is to use more efficient modulation formats for the transmitted information. This can be used in conjunction with Wavelength Division Multiplexing (WDM). Furthermore, Space Division Multiplexing (SDM) is being used in order to increase the capacity of transmission through one fiber while maintaining the possibility of the transmission over long distances.

In NPL1, an SDM transmission system implemented with a Multi Core Fiber (MCF) and multicore—erbium doped fiber amplifier (MC-EDFA) is used to transmit 40 wavelengths of 128 Gb/s PM-QPSK signal over 6,160 km of 7-core MCF. The MCF consists of several cores conducting optical signals within the same fiber. The MC-EDFA consists in a fiber amplifier with MCF as gain medium. The MC-EDFA consists in pumping individually the cores of a single MCF gain medium with separate pumps, by scheme of direct core pumping. This system demonstration highlights the possibility to multiply the system capacity by the number of core of MCF, namely 7 cores in NPL1. By using MCF, it is possible to use the multiplicity of cores to spatially multiplex signals, in addition to WDM in each core, increasing the capacity transmitted through fibers without sacrificing the transmitted distance.

Another advantage of SDM is the benefit brought by the SDM amplifiers for power consumption of the transmission line and its node. As shown in NPL1, EDFA can be integrated with MC-EDFA bringing benefits in power consumption from the implementation of direct core pumped MC-EDFA. Reduction of power consumption at amplifiers is of primary importance for the system to allow system scalability to very high capacity and the reduction of operation expenditure (OPEX) through reduction of consumed electricity.

Furthermore, NPL2 discloses another type of MC-EDFA based on batch amplification with common cladding pumping scheme, where a more powerful laser is pumping simultaneously, all cores of the MCF gain medium, using cladding launching. Common cladding pumping enables significant power reduction for high output amplification compared to parallelization of standard EDFA or direct core pumping MC-EDFA.

Details of the implementation of cladding pumping EDFA and results of the demonstration of signal transmission and amplification with such amplificatory are provided in NPL3. However, cladding pumping MC-EDFA has the disadvantage of the absence of individual core control. Therefore, separate equalization is required to adjust the output of the different SDM channels of MC-EDFA in this scheme.

Rather than introducing loss elements on the SDM channels, PTL1, which is based on NPL4, proposes a hybrid MC-EDFA scheme, which combines cladding pumping for the benefits of low power and direct core pumping for individual control of the performance of the SDM channels, for the case of Erbium and Ytterbium doped amplifiers. In NPL4, the pumping power for cladding pumping is kept constant and the pumping power for direct core pumping is adjusted to perform AGC (Automatic Gain Control) on individual cores. This enables close performance between all the multiplexed channels, not limiting the system performance with channels with lesser transmission characteristics.

Furthermore, in NPL5 the hybrid pumping scheme for MC-EDFA is used in order to reduce the power consumption of the amplifier, compared to cladding pumping scheme and core direct pumping schemes. PTL2 discloses an optical amplifier capable of controlling its gain profile. However, the amplifier described in PTL2 is an amplifier using single core fiber gain medium, not multicore fiber. It does not apply cladding pumping and core pumping at the same time. It enables to compensate to compensate gain shape variation due to temperature variations but it does not enable reduction of power consumption of the amplifier. PTL3 discloses an optical fiber laser device having a heat detector for detecting a rupture of the optical fiber. PTL3 regards a fiber laser, therefore the device of PTL3 does not enable to guarantee the integrity and the quality of an input signal after amplification. The device of PTL3 does not enable to amplify signals in different core of a multicore gain medium. Furthermore, as it may comprise several lasers, they are all used as pump in the same manner for the fiber laser, whereas the present invention features a first laser for cladding pumping and a second lasers for core pumping. As a result, even if the device of PTL3 enables faster control and manufacturing for a fiber laser, it does not enable reduction of power consumption of an optical amplifier.

CITATION LIST

Patent Literature

[PTL 1] Japanese Patent No. 5950426
[PTL 2] Japanese Unexamined Patent Application Publication No. 2004-363631
[PTL 3] Japanese Unexamined Patent Application Publication No. 2010-171322

Non Patent Literature

[NPL 1] H. Takahashi et al., "First Demonstration of MC-EDFA-Repeatered SDM Transmission of 40×128-Gbit/s PDM-QPSK Signals per Core over 6,160-km 7-core MCF", ECOC 2012, paper Th.3.C.3.
[NPL 2] Y. Tsuchida et al., "Multicore erbium doped fiber amplifier for space division multiplexing", Photonics Society Summer Topical Meeting 2013, paper TuC3.1.
[NPL 3] K. Takeshima et al., "51.1-Tbit/s MCF Transmission over 2,520 km Using Cladding Pumped 7-core EDFAs", OFC 2015, paper W3G.1.
[NPL 4] H. Ono et al., "Study on gain control of MC-EDFA by using hybrid pumping of cladding- and core-direct-pumping schemes", IEICE Technical report, OCS2014-116, OPE2014-222 (2015-02), pages 111-115.

[NPL 5] E. Le Taillandier de Gabory et al., "Investigations on Reduction of Power Consumption of Optical Amplification with Hybrid Pumping Scheme Multicore EDFA and Minimized Number of Lighten Cores", IEICE Society Conference 2016, paper B-10-48.

[NPL 6] K. S. Abedin et al., "Seven-core erbium-doped double-clad fiber amplifier pumped simultaneously by side-coupled multimode fiber", Optics Letters, Vol. 39, No. 4, pp 993-996.

SUMMARY OF INVENTION

Technical Problem

Nevertheless, systems using SDM technologies for amplifiers with MC-EDFA or for transmission with MCF are used in environment, where temperature varies over large ranges, for instance from 0° C. to 75° C., during the use of the system and the amplifiers. The temperature is dependent on the outside temperature, e. g. day or night temperature, summer or winter, when the amplifier is located in an environment, where outside temperature is not fully controlled. The temperature is also dependent on the heat generated by other equipment used for telecommunication.

For instance, when the transmission system is loaded with high capacity to accommodate more internet traffic, more cores and therefore more transponders, more pumping elements are used, which generated more heat and increases temperature. In contrast, when less capacity is used to accommodate lower internet traffic, less transponders, less pumping elements are used, which generated less heat and temperature will remain lower. Therefore the changes of temperature are susceptible to follow daily patterns, seasonal patterns or more random traffic patterns.

In the case of a hybrid MC-EDFA with common cladding pumping and direct core pumping, the power consumption of the active components, including pump lasers, are varying with ambient temperature or case temperature of their package. More specifically, with hybrid pumping schemes, as different pumping schemes are combined, and as each will have different power consumption depending on temperature, the power consumption of the amplifier will vary over the life time of the amplifier, depending on temperature.

Therefore there is a need for reduction of power consumption of optical amplifiers during the life time of networks, when the temperature changes.

OBJECT OF THE INVENTION

An exemplary object of the invention is to provide an optical amplifier and a method for amplifying an optical signal, which solve the above-mentioned problem that the power consumption of optical amplifiers is not optimized over the life time of an amplifier, whose temperature in use varies.

Solution to the Problem

An optical amplifier according to an exemplary aspect of the invention includes:

a gain medium for amplifying a plurality of optical channels, the gain medium including a plurality of cores through which the plurality of optical channels to propagate respectively and a cladding area surrounding the plurality of cores;

a monitor that monitors the temperature of the optical amplifier and producing a monitoring result;

a first light source that emits a first light beam to excite the cladding area;

a second light source that emits a plurality of second light beams to excite each of the plurality of cores individually; and a controller that controls the first light source and the second light source based on the produced monitoring result.

A method for amplifying optical signal of an optical amplifier according to an exemplary aspect of the invention including:

amplifying, by a gain medium, a plurality of optical channels, the gain medium including a plurality of cores through which the plurality of optical channels to propagate respectively and a cladding area surrounding the plurality of cores;

monitoring the temperature of the optical amplifier and producing a monitoring result;

exciting the cladding area of the gain medium with a first light source;

exciting each of the plurality of cores individually with a second light source; and controlling the first light source and the second light source based on the produced monitoring result.

Advantageous Effects of Invention

An exemplary advantage according to the present invention is to reduce the power consumption of optical amplifiers during the life time of the amplifiers and networks, the reduction of power consumption being effective when the temperature of the amplifier varies.

BRIEF DESCRIPTION OF DRAWINGS

The above and other advantages and features of the present invention will be more apparent from the following descriptions taken in conjunction with the accompanied drawings.

DESCRIPTION OF EMBODIMENTS

Figure 1:
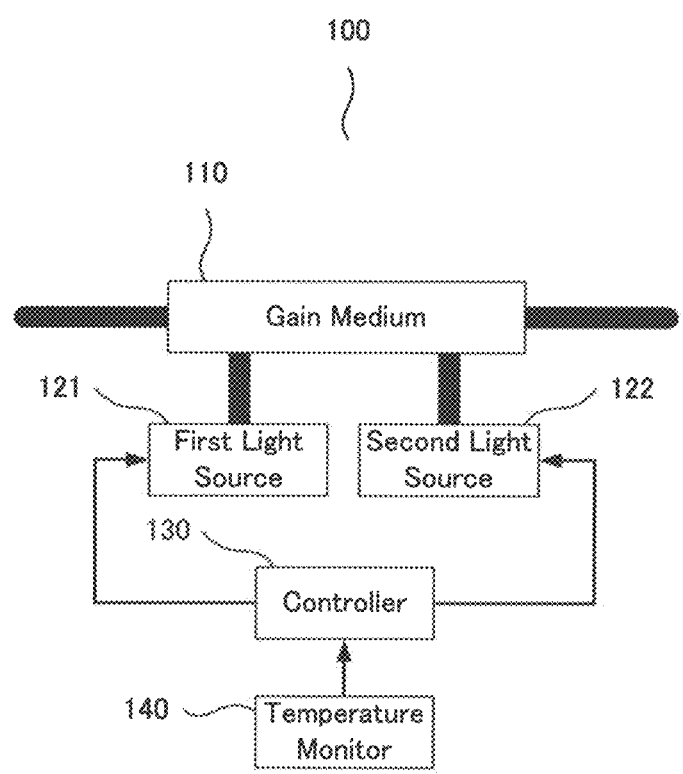
FIG. 1 is a block diagram illustrating the configuration of an optical amplifier in accordance with a first example embodiment of the present invention.

Example embodiments of the present invention are described below referring drawings. Note that, while each of the arrows shown in the drawings is added in order to indicate typical direction of corresponding signal, each of the arrows does not restrict the direction of the signal of the example embodiments.

First Example Embodiment

FIG. 1 is a block diagram illustrating the configuration of an optical amplifier in accordance with a first example embodiment of the present invention. The optical amplifier 100 includes a gain medium 110, a temperature monitor (monitoring means) 140, a first light source 121, a second light source 122, and a controller (controlling means) 130.

The gain medium 110 amplifies a plurality of optical channels. The gain medium 110 includes a plurality of cores through which the plurality of optical channels propagate respectively and a cladding area surrounding the plurality of cores. The temperature monitor 140 monitors a temperature in the optical amplifier 100 and produces a monitoring result. The monitoring result may be an electrical signal that indicates the temperature. The first light source 121 is configured to emit a first light beam to excite the cladding area of the gain medium 110. The second light source 122 is configured to emit a plurality of second light beams to excite each of the plurality of cores of the gain medium individually.

The controller 130 may be an electric circuit. The controller 130 controls the first light source 121 and the second light source 122 based on the monitoring result produced by the temperature monitor 140, in order to control the amplification and the ratio between the optical power emitted by the first light source 121 and the optical power emitted by the second light source 122. The above-mentioned configuration makes it possible to reduce the power consumption of optical amplifier 100 over the optical amplifier's life time by performing the operation described below.

Next, the operation of the optical amplifier 100 in accordance with the present example embodiment is described. The controller 130 may increase optical power of the first light beam if the monitored temperature becomes higher than a predetermined value. Also, the controller 130 may decrease optical power of the first light beam if the monitored temperature becomes lower than a predetermined value.

The controller 130 may increase optical power of the first light beam if optical power of the plurality of second light beams decreases. Also, the controller 130 may decrease optical power of the first light beam if optical power of the plurality of second light beams increases.

The controller 130 may increase the optical power of the first light beam if the monitored temperature increases. The controller 130 may decrease the optical power of the first optical light beam if the temperature decreases.

The controller 130 may set optical power of the first light beam at one of a plurality of preset values. Also, the controller 130 may set optical power of the second light beam at one of a plurality of preset values.

Next, a method for amplifying an optical signal in accordance with the present example embodiment is described. In the method for amplifying an optical signal, a gain medium for amplifying a plurality of optical channels is prepared. Here, the gain medium includes a plurality of cores through which the plurality of optical channels to propagate respectively and a cladding area surrounding the plurality of cores. The temperature of the optical amplifier is monitored and a monitoring result is produced. In addition, a first light beam is configured to excite the cladding area. A plurality of second light beams are configured to excite each of the plurality of cores individually. Optical power of the first light beam and the plurality of second light beams are controlled based on the produced monitoring result.

Second Example Embodiment

Figure 2:
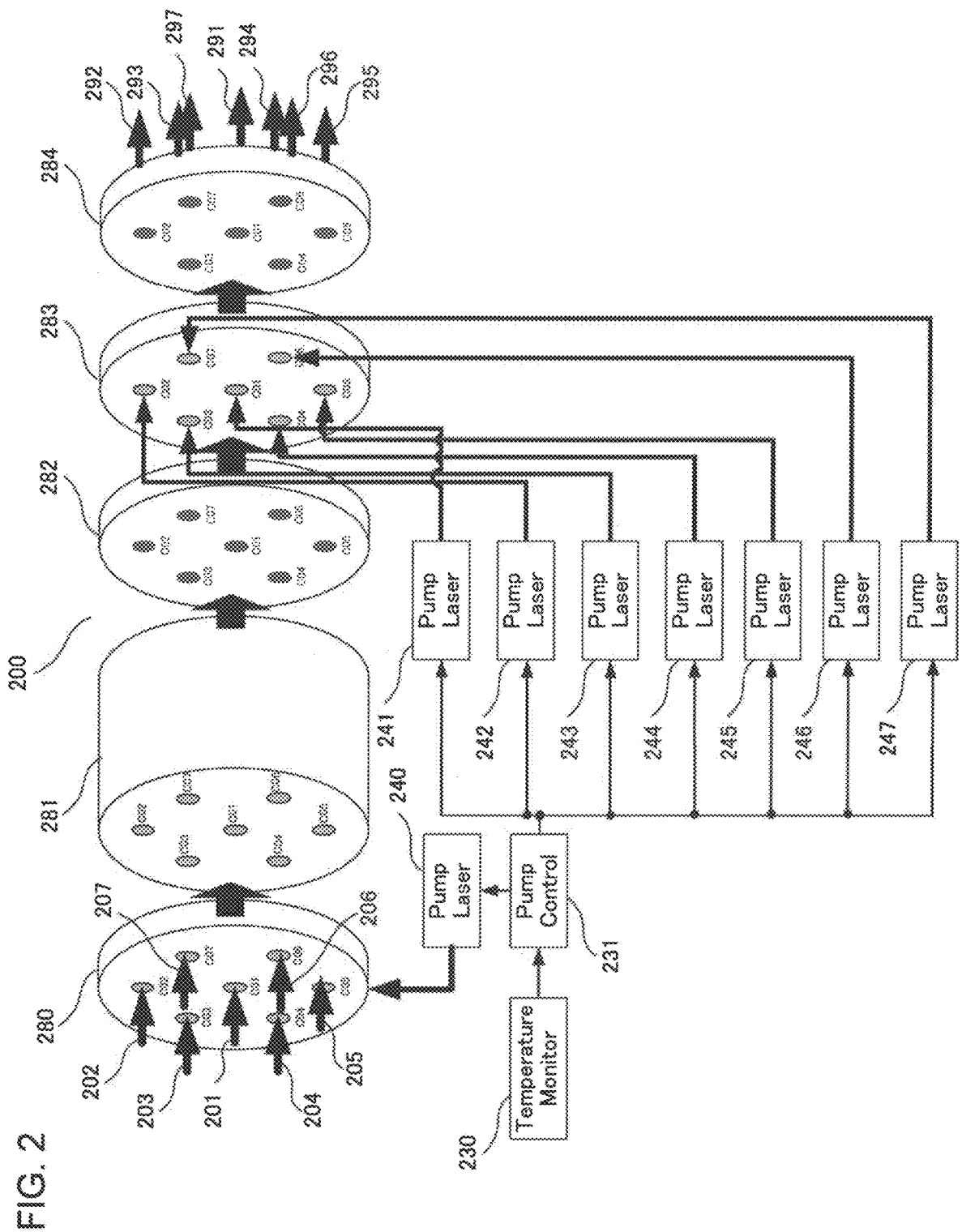
FIG. 2 is a schematic view illustrating the configuration of an optical amplifier in accordance with a second example embodiment of the present invention.

FIG. 2 is a schematic representation of an optical amplifier 200, according to a second example embodiment of the present invention. The optical amplifier 200 receives 7 input SDM channels 201, 202, 203, 204, 205, 206 and 207. The optical amplifier 200 amplifies the SDM channels 201, 202, 203, 204, 205, 206 and 207 optically to be output respectively to the 7 SDM channels 291, 292, 293, 294, 295, 296 and 297.

Each of the SDM channels may be constituted of one or several multiplexed WDM optical signals. Each of the SDM channels may either comprise no optical signal. The optical amplifier 200 uses 7-core configuration, one core being use for each of the input and output signals. The input signals may be provided to the optical amplifier 200 through a 7 core MCF. Identically, the output signals may be provided by the optical amplifier 200 to a 7-core MCF. The input and output 7-core MCF may be connected through connectors to the optical amplifier 200. Alternatively, the input and output 7-core MCF may be spliced to the optical amplifier 200.

The optical amplifier 200 includes a WDM coupler 280, gain medium 281, a pump stripper 282, a WDM coupler 283 and an isolator 284. The components denoted with the numerals 280 to 284 accommodate the 7 SDM channels denoted C01, C02, C03, C04, C05, C06 and C07. The coupler 280 may include a 7 SDM channel isolator. The WDM coupler 280 combines the 7 input SDM channels with a pump light generated by the pump laser 240.

The pump laser 240 operates in cladding pumping manner. The pump laser 240 may be a high power multimode laser diode of wavelength of 980 nm.

The output of the coupler 280 is provided to the gain medium 281. The gain medium 281 is a 7-core MCF doped with erbium ions. The 7 cores of the gain medium 281 are also denoted with the numerals C01, C02, C03, C04, C05, C06 and C07. The amplified signals pass through the pump stripper 282, which removes the remaining of the pump light generated by the pump laser 240. The output of the pump stripper 282 is provided to the WDM coupler 283. The coupler 283 combines the output of the 7 pump lasers denoted 241, 242, 243, 244, 245, 245, 246 and 247 with the MCF for directly pumping the individual respective cores C01, C02, C03, C04, C05, C06 and C07 of the gain medium 281.

The pump lasers 241 to 247 may be single mode lasers with wavelength of 1480 nm. The output of the coupler 283 passes through the isolator 284. The output signals denoted 291 to 297 have been amplified through the gain medium 281 by cladding pumping of the pump laser 240 and by direct core pumping of the pump lasers 241 to 247.

The temperature monitor 230 monitors the temperature of the optical amplifier 200. It may be realized with a thermistor and a monitoring circuit. The output of the temperature monitor 230 may be an electric signal and is provided to the pump control circuit 231. The pump control circuit 231 controls the individual optical outputs of the pump laser 240 for cladding pumping and of the pump lasers 241, 242, 243, 244, 245, 246 and 247 for direct core pumping, according to the signal provided by the temperature monitor 230. The output of the pump lasers can be controlled by the pump control circuit 231 through the tuning of their respective operating intensities.

The temperature monitor 230 may be realized with a thermistor mounted on the package of the optical amplifier 200. In an alternative implementation, the temperature monitor 230 may be a thermistor and its monitoring circuit, mounted on the surface of the pump control circuit 231. In an alternative implementation, the temperature monitor 230 may be realized with a thermistor mounted on metal heat sink used for one of the pump lasers 240 to 247.

Next, the operation of the optical amplifier 200 is described. The pump laser 240 is a high power multimode laser, which operates in uncooled manner. The pump lasers 241 to 247 include one or more thermoelectric coolers (TEC) to maintain their respective laser diode at constant temperature. For a monitored temperature of 25° C. with the temperature monitor 230, the pump laser 240 and the individual pump lasers 241 to 247 are operated at predetermined values of operation currents, in order for the output amplified power by the cores C01 to C07 of the optical amplifier 200 to be equal to a set value.

When the temperature of the optical amplifier 200 increases, the temperature monitor 230 reflects this increase. The pump control circuit 231 increases the operating current of the pump laser 240 and decreases the operating current of the pump lasers 241 to 247 accordingly to maintain the output amplified power by the cores C01 to C07 of the optical amplifier 200 equal to the set value. As the power consumption of the cooled laser diodes increases with higher temperature, the power consumption of the optical amplifier 200 is decreased.

When, the temperature of the optical amplifier 200 decreases, the temperature monitor 230 reflects this decrease. The pump control circuit 231 decreases the operating current of the pump laser 240 and increases the operating current of the pump lasers 241 to 247 accordingly to maintain the output amplified power by the cores C01 to C07 of the optical amplifier 200 equal to the set value. As the power consumption of the cooled laser diodes decreases with lower temperature, the power consumption of the optical amplifier 200 is decreased.

According to the control of the pump control circuit 231, the power consumption of the optical amplifier 200 is reduced efficiently, for any operation temperature.

Third Example Embodiment

Figure 3:
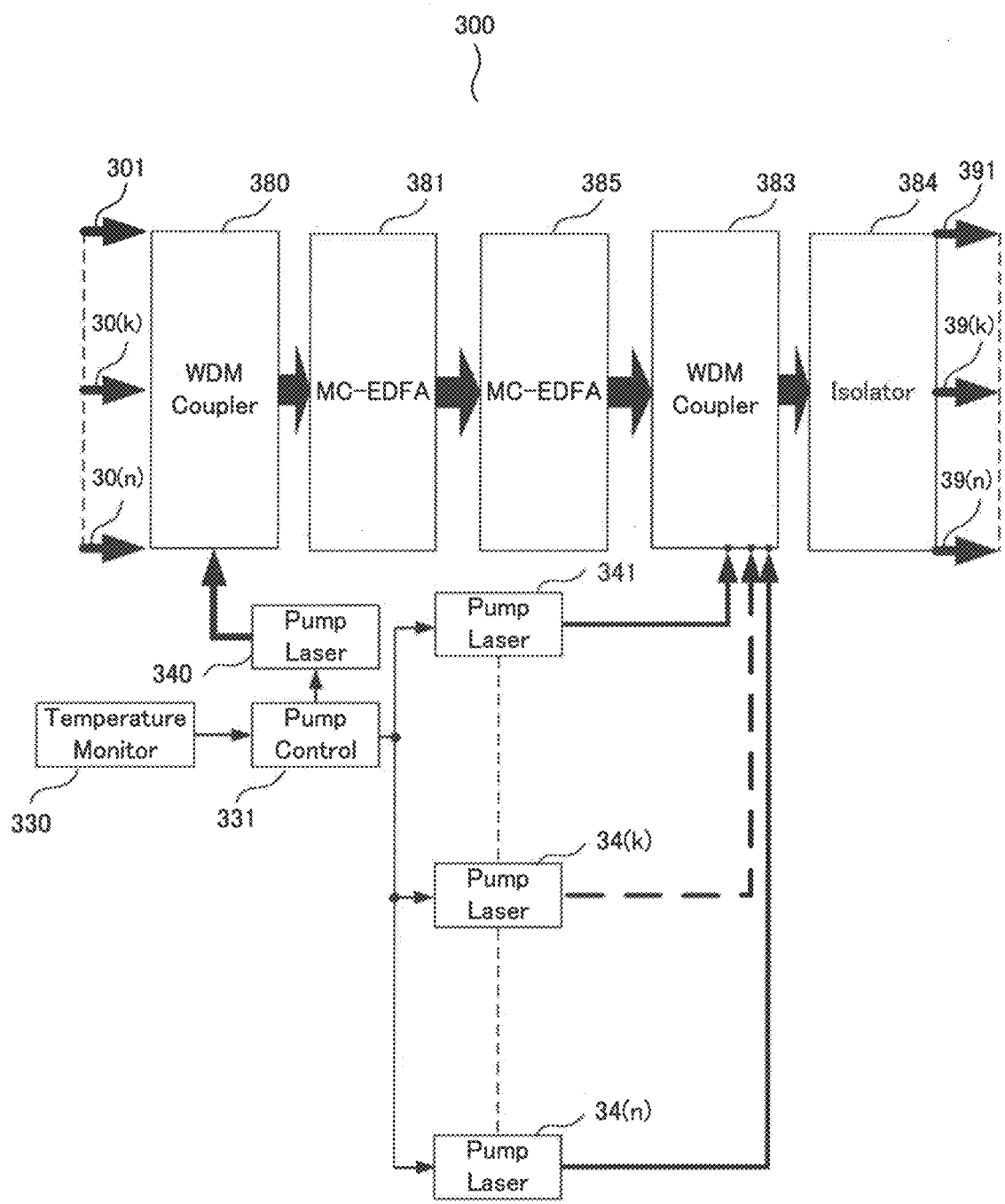
FIG. 3 is a block diagram illustrating the configuration of an optical amplifier in accordance with a third example embodiment of the present invention.
Figure 4:
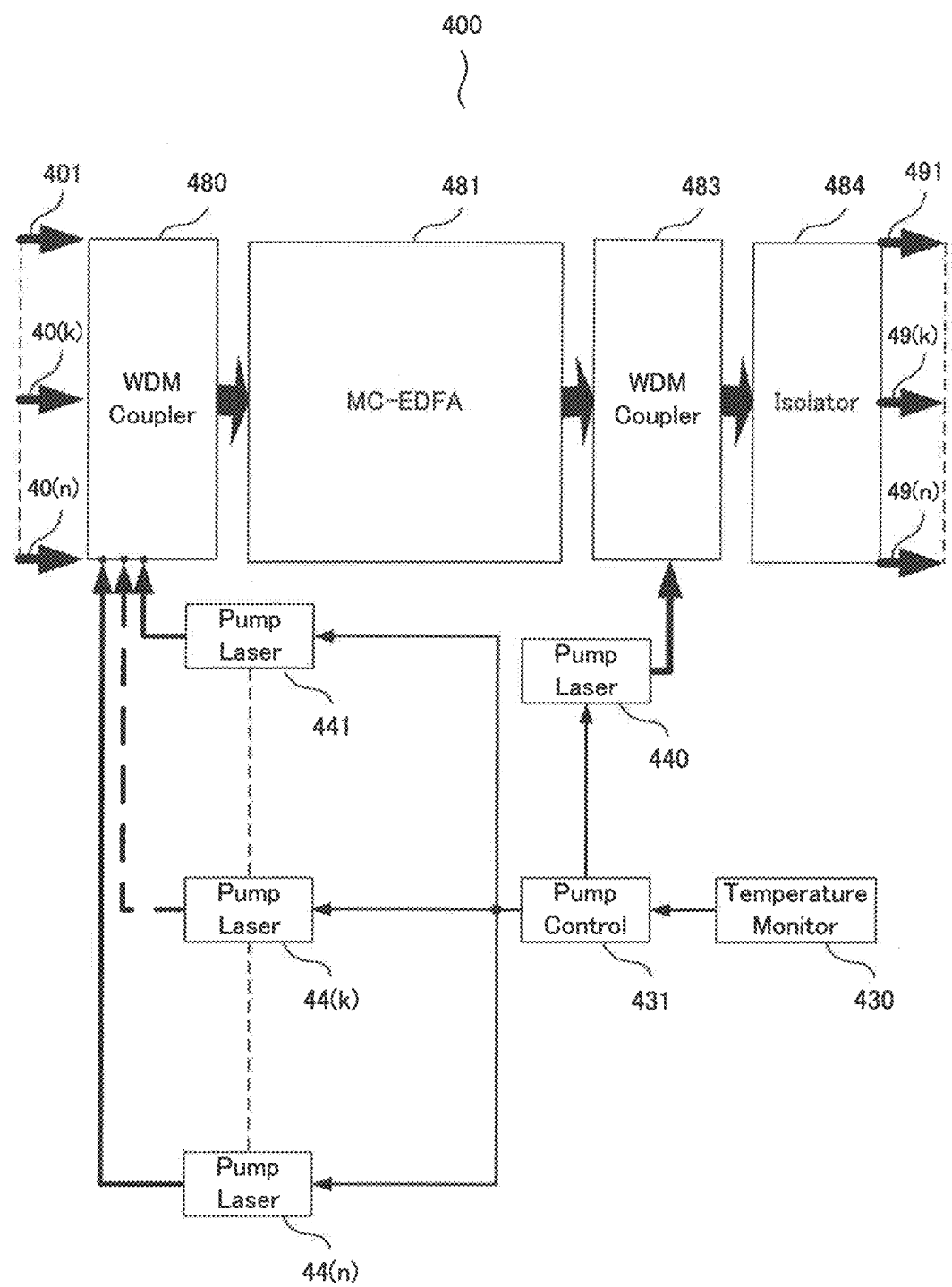
FIG. 4 is a block diagram illustrating the configuration of an optical amplifier in accordance with a fourth example embodiment of the present invention.
Figure 5:
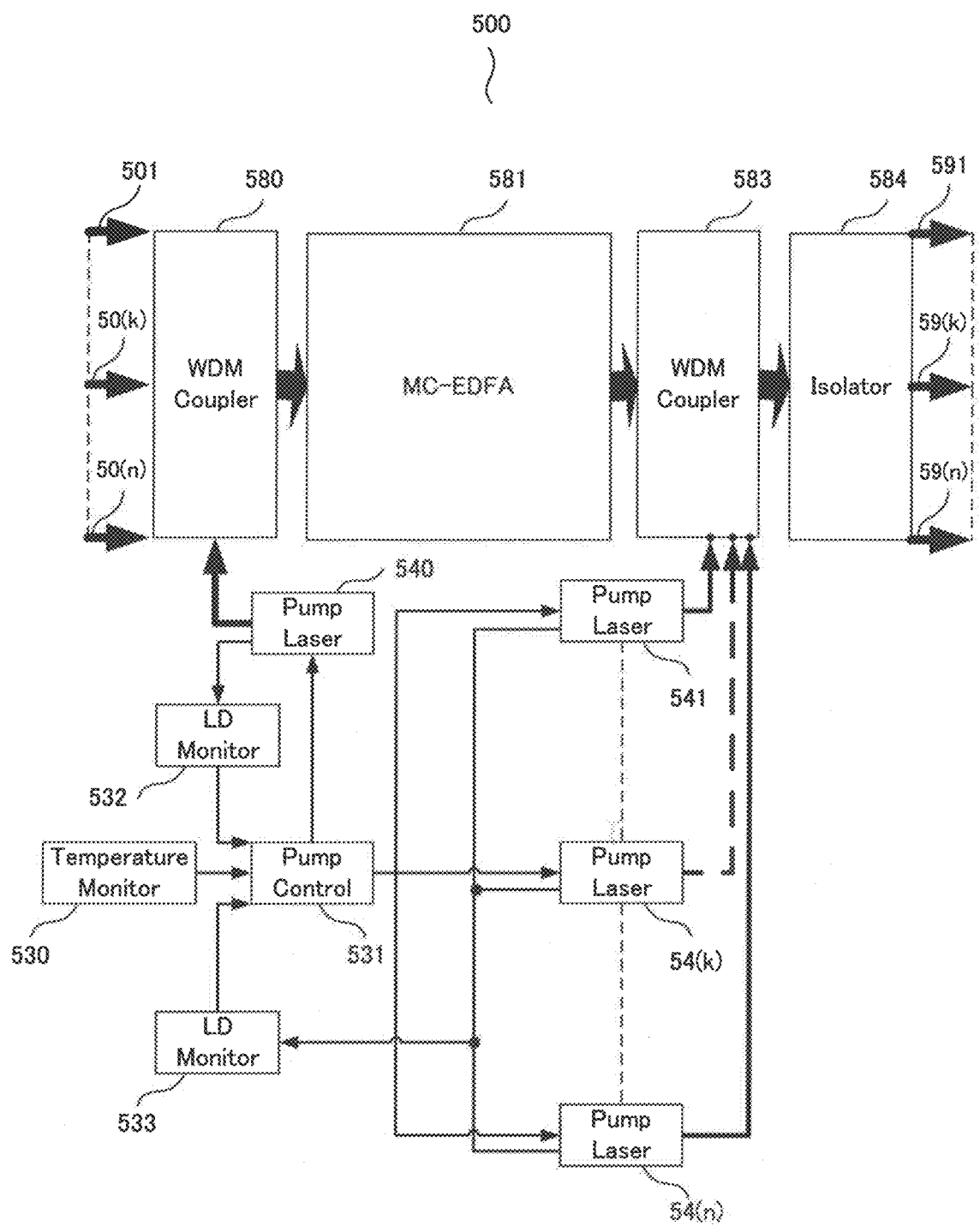
FIG. 5 is a block diagram illustrating the configuration of an optical amplifier device in accordance with a fifth example embodiment of the present invention.

FIG. 3 is a schematic representation of an optical amplifier 300, according to a third example embodiment of the invention. FIGS. 3 to 5 represent the structure of optical amplifiers in simplified manner. The optical amplifier 300 receives n input SDM channels 301 to 30($n$) and amplifies them optically to be output respectively to the n SDM channels 391 to 39($n$). Here, n is an integer larger than 1. In FIG. 3, k is an integer less than n. The SDM channels 301 to 30($n$) correspond to the channels 201 to 207 described in the second example embodiment and FIG. 2. The input signals may be provided to the optical amplifier 300 through an n core MCF. Identically, the output signals may be provided by the optical amplifier 300 to an n core MCF. Alternatively, the n SDM channels may be provided by several MCF with number of cores lower than n. The input and output of the MCF may be connected through connectors to the optical amplifier 300. Alternatively, the input and output MCF may be spliced to the optical amplifier 300.

The optical amplifier 300 includes a WDM coupler 380, a first gain medium 381 and a second gain medium 385 (MC-EDFA), a WDM coupler 383, and an isolator 384, which are identical in function to the respective elements 280, 281, 283 and 284. Pump strippers may be integrated in the gain media 381 and 385. The elements denoted with the numerals 380 to 385 accommodate the n SDM channels. The WDM coupler 380 combines the n input SDM channels 301 to 30($n$) with a pump lightwave generated by the pump laser 340.

The pump laser 340 is identical to the pump laser 240 and it operates in cladding pumping manner. Alternatively, the pump laser 340 may include several laser diodes, whose outputs are combined and operates also in cladding pumping manner.

The output of the WDM coupler 380 is provided to the first gain medium 381, consisting in an n MCF doped with erbium ions. The gain medium 381 is pumped in cladding pumping manner by the pump laser 340. The output of the first gain medium 381 is provided to a second gain medium 385, consisting in an n MCF doped with erbium ions.

The gain medium 385 is pumped in direct core pumping manner by the n pump lasers 341 to 34($n$). The pump lasers 341 to 34($n$) correspond to the pump lasers 241 to 247. The amplified signals output from the gain medium 385 are provided to the WDM coupler 383, which combines the amplified signals to the output of the n outputs of the pump lasers 341 to 34($n$). Each of the pump lasers 341 to 34($n$) pumps directly one of the n cores of the gain medium 385.

The output signals of the coupler 383 pass the isolator 384. The output signals denoted 391 to 39($n$) have been amplified through the gain medium 381 by cladding pumping of the pump laser 340, and through the gain medium 385 by direct core pumping of the pump lasers 341 to 34($n$).

The temperature monitor 330 monitors the temperature of the amplifier 300, identically to the temperature monitor 230 of FIG. 2. The output of the temperature monitor 330 is provided to the pump control circuit 331, which controls the individual optical outputs of the pump laser 340 and of the pump lasers 341 to 34($n$) identically to the pump control circuit 231.

According to the control of the pump control circuit 331, the output level difference between SDM channels is reduced and the power consumption of the amplifier 300 is reduced efficiently, for any operating temperature. Exemplary benefits of the operation of the optical amplifier 300 are described later with simulation results as FIG. 7 and FIG. 8.

Fourth Example Embodiment

FIG. 4 is a schematic representation of an optical amplifier 400, according to a fourth example embodiment of the present invention. The optical amplifier 400 receives n input SDM channels 401 to 40($n$) and amplifies them optically to be output respectively to the n SDM channels 491 to 49($n$).

The SDM channels 401 to 40(*n*) and 491 to 49(*n*) are identical to the respective channels 301 to 30(*n*) and 391 to 39(*n*). The input signals may be provided to the optical amplifier 400 through an n core MCF. Identically, the output signals may be provided by the optical amplifier 400 to an n core MCF. Alternatively, the n SDM channels may be provided by several MCF with number of cores lower than n. The input and output of the MCF may be connected through connectors to the amplifier 400. Alternatively, the input and output MCF may be spliced to the amplifier 400.

The amplifier 400 comprises a WDM coupler 480, a gain medium 481 (MC-EDFA), a WDM coupler 483 and an isolator 484, which are similar in function to the respective elements 280, 281, 283 and 284. Pump strippers may be integrated in the gain medium 481. The elements denoted with the numerals 480 to 484 accommodate the n SDM channels.

The WDM coupler 483 combines the n input SDM channels 401 to 40(*n*) with a pump lightwave generated by the pump laser 440. The pump laser 440 is a high power multimode laser of wavelength of 1480 nm. The pump laser 440 operates in cladding pumping manner. Alternatively, the pump laser 440 may include several laser diodes, whose outputs are combined and operates also in cladding pumping manner.

The gain medium 481 is pumped in cladding pumping manner by the pump laser 440. The gain medium 481 consists in an n core MCF doped with erbium ions. The WDM coupler 480 combines the respective signals 401 to 40(*n*) to the light output by the respective pump lasers 441 to 44(*n*). The output of the coupler 480 is provided to the gain medium 481, consisting in an n MCF doped with erbium ions.

The gain medium 481 is also pumped in direct core pumping manner by the n pump lasers 441 to 44(*n*), whose output light wavelengths are 980 nm. The amplified signals are provided to the WDM coupler 483, which combines the amplified signals to the output of the n outputs of the pump lasers 441 to 44(*n*). Each of the pump lasers 441 to 44(*n*) pumps directly one of the n cores of the gain media 481. The output of the WDM coupler 483 passes the isolator 484. The output signals denoted 491 to 49(*n*) have been amplified through the gain media 481 by cladding pumping of the pump laser 440 and by direct core pumping of the pump lasers 441 to 44(*n*).

Next, the operation of the amplifier 400 is described. The pump laser 440 is a high power multimode laser, which operates in uncooled manner. The pump lasers 441 to 44(*n*) comprise TEC to maintain their respective laser diode at constant temperature. For a monitored temperature of 25° C. with the temperature monitor 430, the pump laser 440 for cladding pumping and the individual pump lasers 441 to 44(*n*) for direct core pumping are operated at predetermined values of operation currents, in order for the output amplified power by the cores of the MCF to be equal to a set value.

When, the temperature of the amplifier 400 increases, the temperature monitor 430 reflects this increase. The pump control circuit 431 increases the operating current of the pump laser 440 and decreases the operating current of the pump lasers 441 to 44(*n*) accordingly to maintain the output amplified power by the cores of the MCF equal to the set value. As the power consumption of the cooled laser diodes increases with higher temperature, the power consumption of the amplifier 400 is decreased.

When, the temperature of the amplifier 400 decreases, the monitor 430 reflects this decrease. The pump control circuit 431 decreases the operating current of the pump laser 440 and increases the operating current of the pump lasers 441 to 44(*n*) accordingly to maintain the output amplified power by the cores of the MCF equal to the set value. As the power consumption of the cooled laser diodes decreases with lower temperature, the power consumption of the amplifier 400 is decreased. According to the control of the circuit 431, the power consumption of the amplifier 400 is reduced efficiently, for any operation temperature.

In an alternative implementation, the pump laser 440 is a multimode laser, which is cooled with a TEC. The pump lasers 441 to 44(*n*) are lower power laser, which operate in an uncooled manner. For a monitored temperature of 25° C. with the temperature monitor 430, the cladding pumping laser (the pump laser 440) and the individual core pumping lasers (the pump lasers 441 to 44(*n*)) are operated at predetermined values of operation currents, in order for the output amplified power by the core of the MCF to be equal to a set value.

When, the temperature of the amplifier 400 increases, the monitor 430 reflects this increase. The pump control circuit 431 decreases the operating current of the pump laser 440 and increases the operating current of the pump lasers 441 to 44(*n*) accordingly to maintain the output amplified power by the cores of the MCF equal to the set value. As the power consumption of the cooled laser diodes increase with higher temperature, the power consumption of the amplifier 400 is decreased.

When, the temperature of the amplifier 400 decreases, the monitor 430 reflects this decrease. The pump control circuit 431 increases the operating current of the pump laser 440 and decreases the operating current of the pump lasers 441 to 44(*n*) accordingly to maintain the output amplified power by the cores of the MCF equal to the set value. As the power consumption of the cooled laser diode decreases with lower temperature, the power consumption of the amplifier 400 is decreased. According to the control of the circuit 431, the power consumption of the amplifier 400 is reduced efficiently, for any operation temperature.

Fifth Example Embodiment

FIG. 5 is a schematic representation of an optical amplifier 500, according to a fifth example embodiment of the invention. The optical amplifier 500 receives n input SDM channels 501 to 50(*n*) and amplifies them optically to be output respectively to the n SDM channels 591 to 59(*n*). The SDM channels 501 to 50(*n*) are identical to the channels 301 to 30(*n*). The input signals may be provided to the amplifier 500 through an n core MCF.

The amplifier 500 comprises a WDM coupler 580, a gain medium 581, a WDM coupler 583 and an isolator 584, which are identical in function to the respective elements 280, 281, 283 and 284. Pump strippers may be integrated in the gain medium 581. The elements denoted with the numerals 580 to 584 accommodate the n SDM channels. The amplifier 500 is pumped with cladding pumping scheme by the pump laser 540, which is identical to the pump laser 240. The amplifier 500 is also pumped using direct core pumping scheme by the pump lasers 541 to 54(*n*), which correspond to the pump lasers 241 to 247.

The temperature monitor 530 monitors the temperature of the amplifier 500, identically to the temperature monitor 230. In addition, the amplifier 500 includes the laser monitors 532 and 533 (LD monitor). The laser monitors 532 and 533 are electric circuits. The laser monitor 532 measures the package temperature of the pump laser 540 for cladding pumping by monitoring the resistance of the thermistor mounted inside the package of the pump laser 540. The laser monitor 533 measures the package temperature of pump lasers 541 to 54(n) for the n core pumping by monitoring the resistance of the thermistor mounted in the packages of the pump lasers 541 to 54(n). The laser monitor 533 also monitors whether the laser diode and the TEC included in the package of the pump lasers 541 to 54(n) are turned on or off.

The output of the monitors 530, 532 and 533 is provided to the pump control circuit 531, which controls the individual optical outputs of the pumping laser 540 and of the pump lasers 541 to 54(n) identically to the pump control circuit 231.

Next, the operation of the circuit 531 is explained. In this example, we set the numeral n=7 and therefore consider the case of a 7-core MCF for the gain medium 581. In a first network configuration, the traffic is low and therefore only two cores denoted 2 and 4 are used to accommodate traffic. Accordingly, only the channels denoted by 502 and 504 are amplified to the channels 592 and 594. Other channels 501, 503, 505, 506 and 507 do not comprise light.

According to the default setting, the pump laser 540 and only the pump lasers 542 and 544, which pump directly the cores corresponding to the light 502 and 504 are turned on, while the pump lasers 541, 543, 545, 546 and 547 are turned off. The pump laser 540 is uncooled, therefore the monitor circuit 532 monitors the case temperature of the pump laser 540.

In the same manner, as the pump lasers 541, 543, 545, 546 and 547 as well as their temperature control circuits are turned off, which is detected by the laser monitor 533, which monitors their case temperature. In contrast, the laser monitor 533 detects that the pump lasers 542 and 544 are turned on, therefore their internal thermistor only reflect their operation temperature as they are cooled lasers, therefore the laser monitor 533 do not take their respective monitored temperature into account. The pump control circuit 531 controls output lights of the pump lasers 540, 542 and 544, according to the information of the monitors 530, 532 and 533.

For more precision, in an alternative implementation, the pump control circuit 531 selects only the information of the pump lasers which are mounted at the closest distance of the pump lasers which are turned on. Namely, the temperature of the pump lasers 541 and 543 is monitored for the pump laser 542 and the temperature of the pump lasers 543 and 545 is monitored for the pump laser 544. The pump control circuit 531 may control the power of the light emitted by the pump lasers 540, 542 and 544 according to an average temperature of the pump lasers 541, 543 and 545.

Next, in the case, where the amplifier is used in a network with much traffic, high capacity is used; therefore six out of seven cores, namely denoted 1, 2, 3, 4, 5 and 6 are used to accommodate traffic. Accordingly, the channels denoted by 501, 502, 503, 504, 505 and 506 are amplified to the channels 591, 592, 593, 594, 595 and 596. The remaining channel 507 does not comprise light.

According to the default setting, the pump laser 540 and the pump lasers 541, 542, 543, 544, 545 and 546, which pump directly the cores corresponding to the light 501, 502, 503, 504, 505 and 506 are turned on, while the pump lasers 547 is turned off. The pump laser 540 is uncooled, therefore the monitor circuit 532 monitors the case temperature of the pump laser 540. In the same manner, as the pump laser 547 is turned off, which is detected by the laser monitor 533, which monitors their case temperature. In contrast, the laser monitor 533 detects that the pump lasers 541, 542, 543, 544, 545, 546 are turned on, therefore their internal thermistor only reflect their operation temperature as they are cooled lasers, therefore the monitor circuit 531 do not take their respective monitored temperature into account, and only monitors the temperature of the pump laser 547. The pump control circuit 531 controls output lights of the pump lasers 540, 541, 542, 543, 544, 545 and 546, according to the information of the monitors 530, 532 and 533.

Next, in the case, where the amplifier is used in a network with very high traffic, high capacity is used; therefore all cores are used to accommodate traffic. Accordingly, the channels denoted by 501 to 507 are amplified to the channels 591 to 597.

According to the default setting, the pump laser 540 and the pump lasers 541 to 547, which pump directly the cores corresponding to the light 501 to 507 are turned on. The pump laser 540 is uncooled, therefore the monitor circuit 532 monitors the case temperature of the pump laser 540. In contrast, the laser monitor 533 detects that the pump lasers 541 to 547 are turned on, therefore their internal thermistor only reflect their operation temperature as they are cooled lasers, therefore the monitor circuit 531 do not take their respective monitored temperature into account. The pump control circuit 531 controls output lights of the pump lasers 540, 541, 542, 543, 544, 545 and 546, according to the information of the monitors 530, 532 and 533.

According to the control of the circuit 532, the power consumption of the amplifier 500 is reduced efficiently, for any operating temperature. Exemplary benefits of the operation of the optical amplifier 500 are described later with simulation results as FIG. 9 to FIG. 12.

Sixth Example Embodiment

Figure 6:
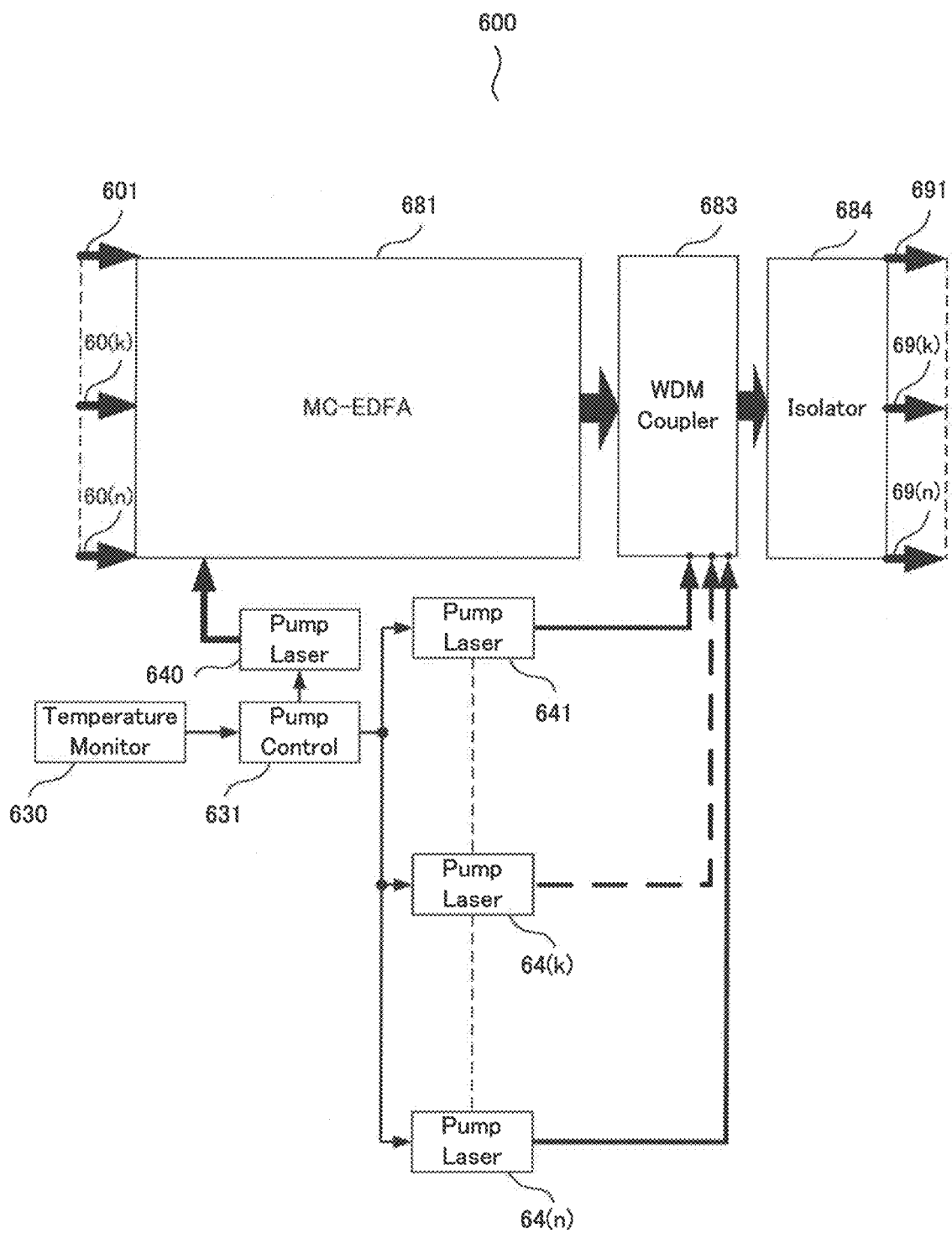
FIG. 6 is a block diagram illustrating the configuration of an optical amplifier device in accordance with a sixth example embodiment of the present invention.

FIG. 6 is a schematic representation of an optical amplifier 600, according to a sixth example embodiment of the invention. The optical amplifier 600 receives n input SDM channels 601 to 60(n) and amplifies the channels optically to be output respectively to the n SDM channels 691 to 69(n). The SDM channels 601 to 60(n) corresponds to the channels 201 to 207.

The input signals may be provided to the optical amplifier 600 through an n core MCF. Identically, the output signals may be provided by the optical amplifier 600 to an n core MCF. Alternatively, the n SDM channels may be provided by several MCF with number of cores lower than n. The input and output of the MCF may be connected through connectors to the amplifier 600. Alternatively, the input and output MCF may be spliced to the amplifier 600.

The amplifier 600 includes a first gain medium 681 (MC-EDFA), a WDM coupler 683 and an isolator 684, which are identical in function to the respective elements 281, 283 and 284. Pump strippers may be integrated in the gain medium 681. The elements denoted with the numerals 681 to 684 accommodate the n SDM channels 601 to 60(n).

The pump laser 640 is identical to the pump laser 240 and it operates in cladding pumping manner. Alternatively, the pump laser 640 may comprise several laser diodes, whose outputs are combined and operates also in cladding pumping manner. The light output by the pump laser 640 is coupled in the cladding of the gain medium 681 by side pumping scheme, similarly to the method described in NPL6. The signals 601 to 60(n) are provided to the cores of the gain medium 681, consisting in an n MCF doped with erbium ions. The gain medium 681 is pumped in cladding pumping manner by the pump laser 640.

The gain medium 681 is also pumped in direct core pumping manner by the n pump lasers 641 to 64(n). The amplified signals are provided to the WDM coupler 683, which combines them to the output of the n outputs of the pump lasers 641 to 64(n). Each of the pump lasers 641 to 64(n) pumps directly one of the n cores of the gain medium 681. The pump lasers 641 to 64(n) may be uncooled lower power pump lasers of same wavelength as the pump laser 640. For instance, the wavelength of the pump lasers 640 to 64(n) may be 980 nm. The output of the WDM coupler 683 passes the isolator 684. The output signals denoted 691 to 69(n) have been amplified through the gain medium 681 by cladding pumping of the pump laser 640 and by direct core pumping of the pump lasers 641 to 64(n).

The temperature monitor 630 monitors the temperature of the optical amplifier 600, identically to the temperature monitor 230. The output of the temperature monitor 630 is provided to the pump control circuit 631, which controls the individual optical outputs of the pump laser 640 and of the pump lasers 641 to 64(n) identically.

Next the operation of the amplifier 600 is described. The pump laser 640 is a high power multimode laser, which operates in uncooled manner. The pump lasers 641 to 64(n) are uncooled lower power lasers, which are less susceptible to temperature variations. For a monitored temperature of 25° C. with the temperature monitor 630, the pump laser 640 and the pump lasers 641 to 64(n) are operated at predetermined values of operation currents, in order for the output amplified power of the amplifier 600 to be equal to a set value.

When, the temperature of the optical amplifier 600 increases, the temperature monitor 630 reflects this increase. The pump control circuit 631 decreases the operating current of the pump laser 640 and increases the operating current of the pump lasers 641 to 64(n) accordingly to maintain the output amplified power by the cores of the amplifier 600 equal to the set value. As the power consumption of lower power pump laser is less susceptible to temperature than that of higher power laser, the power consumption of the amplifier 600 is decreased.

When, the temperature of the amplifier 600 decreases, the monitor 630 reflects this decrease. The pump control circuit 631 increases the operating current of the pump laser 640 and decreases the operating current of the pump lasers 641 to 64(n) accordingly to maintain the output amplified power by the cores of the amplifier 600 equal to the set value. As the power consumption of the lower power pump laser is less susceptible to temperature variations, the power consumption of the amplifier 600 is decreased. According to the control of the circuit 631, the power consumption of the optical amplifier 600 is reduced efficiently, for any operation temperature.

(Simulation Results of the Example Embodiments)

Figure 7:
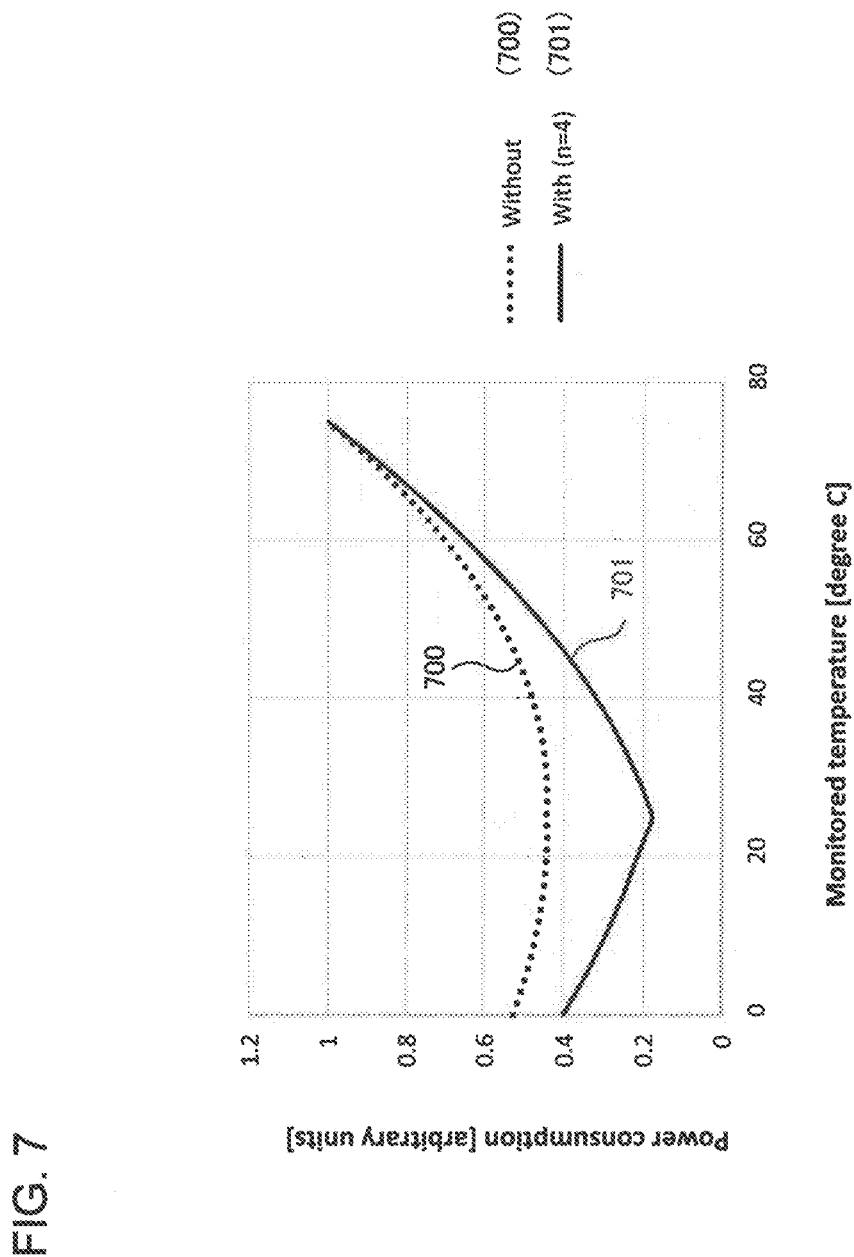
FIG. 7 is a diagram illustrating simulations results of temperature and power consumption in accordance with an example embodiment of the present invention.
Figure 8:
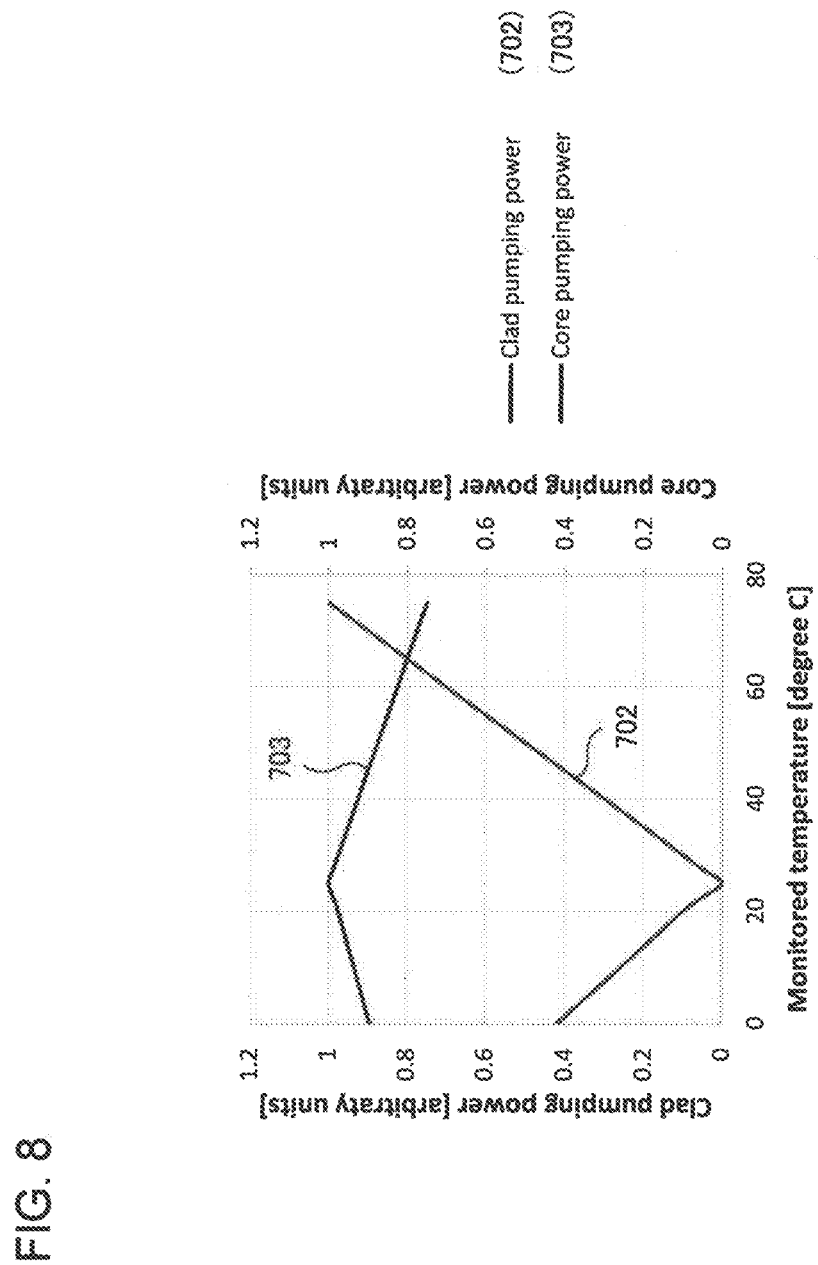
FIG. 8 is a diagram illustrating simulations results of temperature and pumping power in accordance with an example embodiment of the present invention.

Now, an example of operation of the amplifier 300 of the third example embodiment shown in FIG. 3 is given and the exemplary benefits of its operation are illustrated with the simulation results plot on FIG. 7. The numeral n is chosen equal to 4, so that the gain media 381 and 385 have 4 cores. The 4 lasers for core direct pumping (pump lasers 341 to 344) are cooled at an operating temperature of 25° C.

For reference, the curve 700 (denoted as "Without (700)" in FIG. 7) represents the power consumption of a similar hybrid amplifier, which does not implement the third example embodiment. Therefore, the light of the pump laser for cladding pumping 341 and of the pump laser for core direct pumping (pump lasers 341 to 344) are kept constant independently of the temperature of the amplifier, and for more stringent comparison with the present embodiment, it is assumed that the power ratio between cladding pumping and core direct pumping has been optimized at maximum power consumption condition. The power consumption of the amplifier 300 depends on the power consumption of the pump lasers 341 to 344, which vary with temperature.

The curve 701 (denoted as "With (n=4) (701)" in FIG. 7) represents the power consumption of the optical amplifier 300. According to the temperature monitored by the temperature monitor 330, the pump control circuit 331 controls the optical power of the laser for clad pumping (pump laser 340) and the optical power of the laser for core pumping (pump lasers 341 to 344). The optical powers are controlled through the operating current of their respective lasers and the simulated powers are plot on FIG. 8, where the curve 702 (denoted as "Clad pumping power (702)" in FIG. 8) represents the controlled power of the pump laser 340 and the curve 703 (denoted as "Core pumping power (703)" in FIG. 8) represents the controlled optical power of the pump lasers 341 to 344. For the temperature of 25° C., only core direct pumping is used as the power consumptions of the pump lasers 341 to 344 are low compared to the one required for the pump laser 340.

When the temperature deviates from 25° C., the power of core pumping is reduced and the power of cladding pumping is increased. The values of operating current for controlling the power of the pump laser 340 depending on temperature are stored in a lookup table implemented in non-volatile memory of the pump control circuit 331. The values of operating current for controlling the power of core direct pumping are adjusted in order to keep the power of the signal 391 constant. Alternatively, the lookup table may be stored for all possible values of set output power of the signal 391 and the value of the output power of the pump laser 340 are selected depending on the temperature monitored by temperature monitor 330 and on the set target value for power of the signal 391. The power of core direct pumping with the pump lasers 341 to 344 is selected to keep the optical power of the signal 391 constant and equal to the target value. Alternatively, the lookup table stored on the circuit 331 may contain the operating current for the pump lasers 341 to 344 and the power of the pump laser 340 is adjusted to maintain the power of the signal 391 constant. Alternatively, the operating current of the pump laser 340 (Iop(340)) is calculated by linear interpolation according to the following formula, which depends on the absolute value of temperature difference with 25° C.:

$$Iop(340) = \frac{Iop(75) - Iop(25)}{50} \times |T - 25| + Iop(25)$$

where Iop(75) and Iop(25) are calibrated values of operating current of the pump laser 340 for respectively monitored temperature T of 75° C. and 25° C.

It is therefore apparent from FIG. 7 that the present invention enables to reduce the power consumption of SDM amplifier as the curve 701 is always lower than the curve 700, for any temperature, with maximum power reduction at 25° C.

Figure 9:
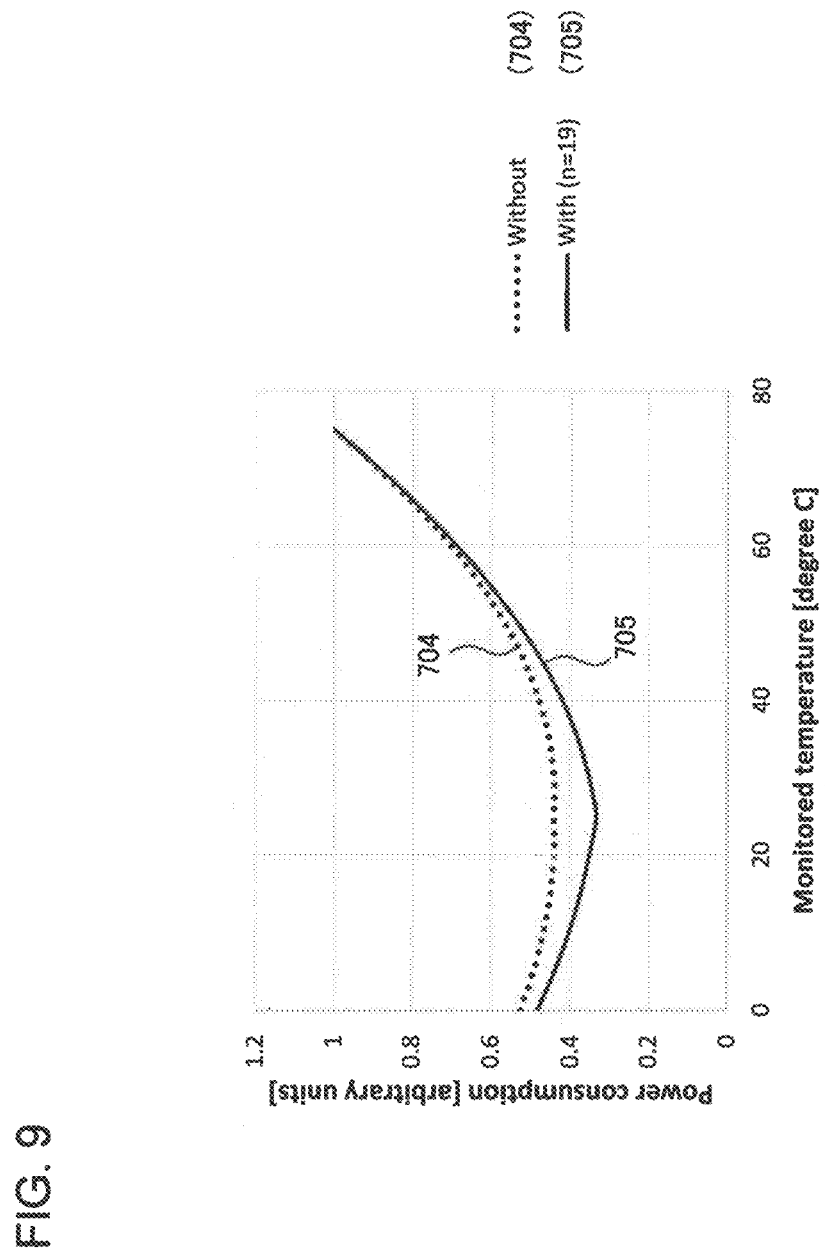
FIG. 9 is a diagram illustrating simulations results of temperature and power consumption in accordance with an example embodiment of the present invention.
Figure 10:
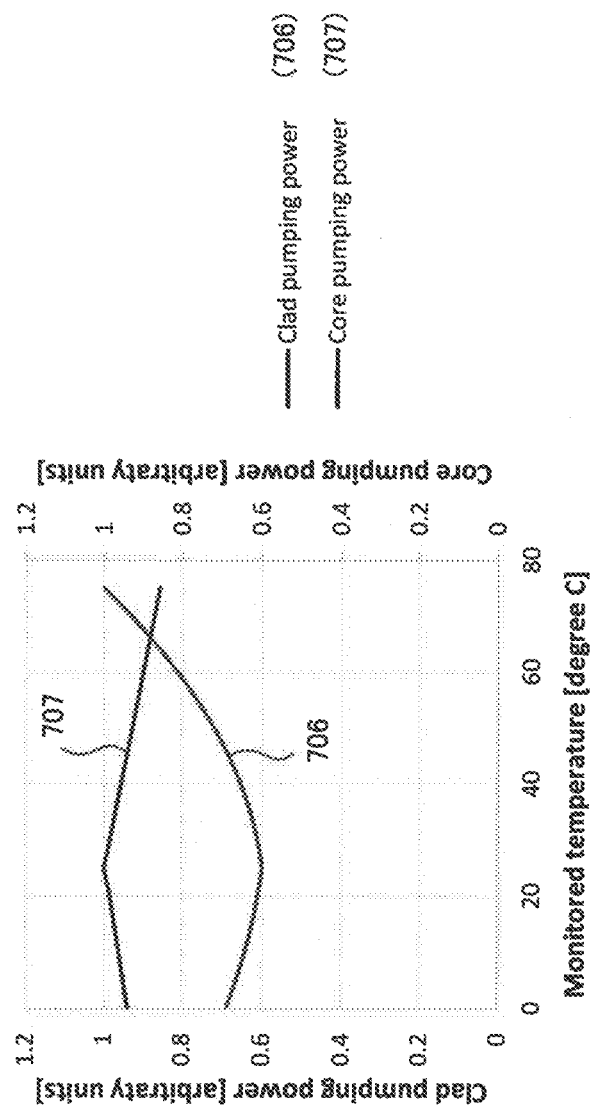
FIG. 10 is a diagram illustrating simulations results of temperature and pumping power in accordance with an example embodiment of the present invention.

Now, another example of operation of the amplifier 500 of FIG. 5 is given and the exemplary benefits of its operation are illustrated with the simulation results plot on FIG. 9. The numeral n is chosen equal to 19, so that the gain medium (MC-EDFA) 581 has 19 cores. The 19 lasers for core direct pumping (pump lasers 541 to 559) are cooled at an operating temperature of 25° C.

For reference, the curve 704 (denoted as "Without (704)" in FIG. 9) represents the power consumption of a similar hybrid amplifier which does not implement the fifth example embodiment. Therefore, the light of the laser for cladding pumping (pump laser 540) and of the laser for core direct pumping (pump laser 541 to 559) are kept constant independently of the temperature of the amplifier, and for more stringent comparison with the present invention, it is assumed that the power ratio between cladding pumping and core direct pumping has been optimized at maximum power consumption condition.

The power consumption of the amplifier 500 depends on the power consumption of the pump lasers 541 to 559, which vary with temperature. The curve 705 (denoted as "With (705)" in FIG. 9) represents the power consumption of the amplifier 500, according to the fifth example embodiment. According to the temperature monitored by monitor circuits 530, 532 and 533, the pump control circuit 531 controls the optical power of the laser for clad pumping (pump laser 540) and the optical power of the laser for cladding pumping (pump lasers 541 to 559). The optical powers are controlled through the operating current of their respective lasers and the simulated powers are plot on FIG. 10, where the curve 706 represents the controlled power of the pump laser 540 and the curve 707 represents the controlled optical power of the pump laser 541 to 559. For the temperature of 25° C., clad pumping is set at is minimum as the power consumptions of the pump lasers 541 to 559 are low compared to the one required for the pump laser 540.

When the temperature deviates from 25° C., the power of core pumping is reduced and the power of cladding pumping is increased. The values of operating current for controlling the power of cladding pumping laser (the pump laser 540) depending on temperature are stored in a lookup table implemented in non-volatile memory of the circuit 531. Alternatively, the operating current of the pump laser 540 is calculated by linear interpolation depending on the absolute value of temperature difference with 25° C. and using calibrated values of operating current of the pump laser 540 for monitored temperature of 75° C. and 25° C.

It is therefore apparent from FIG. 9 that the present invention enables to reduce the power consumption of SDM amplifier as the curve 705 is always lower than the curve 704, for any temperature, with maximum power reduction at 25° C.

Figure 11:
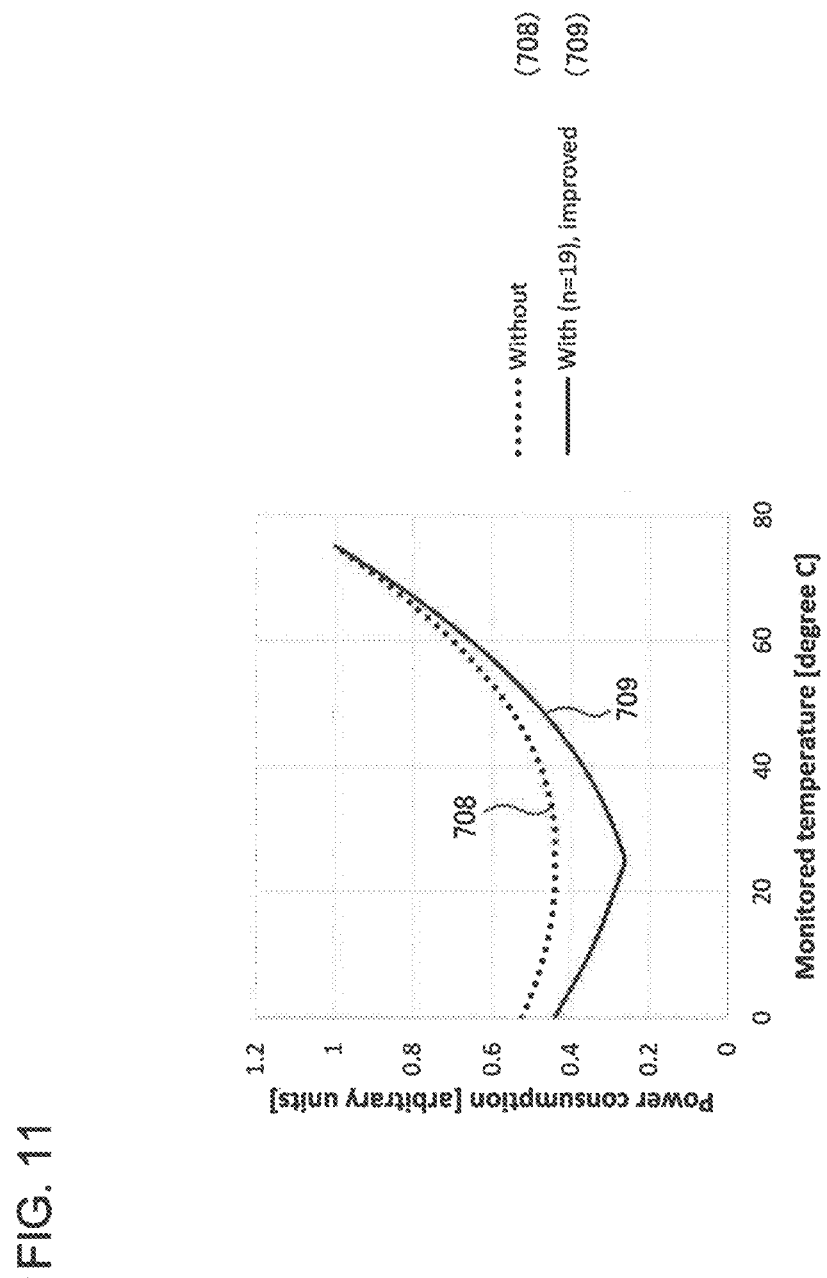
FIG. 11 is a diagram illustrating simulations results of temperature and power consumption in accordance with an example embodiment of the present invention.
Figure 12:
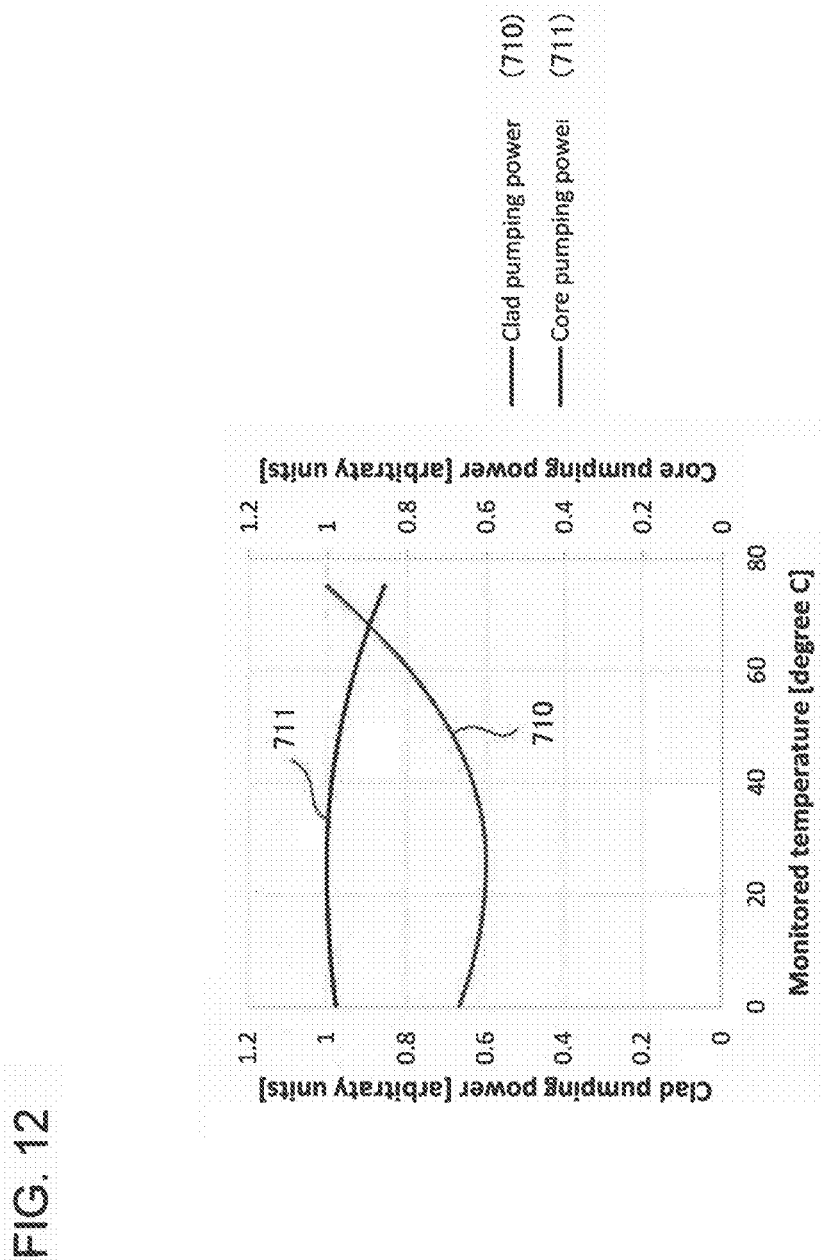
FIG. 12 is a diagram illustrating simulations results of temperature and pumping power in accordance with an example embodiment of the present invention.

Now, for better performance, another example of operation of the amplifier 500 of FIG. 5 is given and the exemplary benefits of its operation are illustrated with the simulation results plot on FIG. 11. Again the numeral n is chosen equal to 19.

For reference, the curve 708 represents the power consumption of a similar hybrid amplifier, which does not implement the fifth example embodiment. Therefore, the light of the laser for cladding pumping (pump laser 540) and of the laser for core direct pumping (pump lasers 541 to 559 are kept constant independently of the temperature of the amplifier, and for more stringent comparison with the present invention, it is assumed that the power ratio between cladding pumping and core direct pumping has been optimized at maximum power consumption condition.

The curve 709 represents the power consumption of the amplifier 500, according to the fifth example embodiment. The optical powers are controlled through the operating current of their respective lasers and the simulated powers are plot on FIG. 12, where the curve 710 represents the controlled power of the pump laser 540 ("Clad pumping power") and the curve 711 represents the controlled optical power of the pump lasers 541 to 559 ("Core pumping power"). The values of operating current for controlling the power of cladding pumping laser (pump laser 540) depending on temperature are stored in a lookup table implemented in non-volatile memory of the circuit 531. Alternatively, the operating current of the pump laser 540 (Iop(540)) is calculated by the second degree equation according to the following formula, which depends on the absolute value of temperature difference with 25° C.:

$$Iop(540)=A \times (T-25)^2 + B \times |T-25| + Iop(25)$$

where Iop(25) is calibrated values of operating current of the pump laser 540 for monitored temperature T of 25° C., and the coefficients A and B are calibrated for two temperatures distinct of 25° C. and are stored in the circuit 531.

It is therefore apparent from FIG. 11 that the present invention enables to reduce the power consumption of SDM amplifier as the curve 709 is always lower than the curve 708, for any temperature, with maximum power reduction at 25° C.

It is apparent that the present invention is not limited to the above described example embodiments, which can be modified and changed without departing from the scope of the invention.

For example, the controller 130, the pump control circuits 231, 331, 431, 531, 631 and peripheral circuits thereof described above may be implemented by hardware alone as means for controlling the corresponding optical amplifiers, or such function of the controlling may be implemented as an controlling method by any implementation means or may be implemented by a combination of hardware and software. If the functions are implemented by a combination of hardware and software, a control program used for controlling the optical amplifier is loaded onto a RAM (Random Access Memory), which is a program storage device, and hardware such as a CPU (Central Processing Unit) is caused to operate based on operations of the control program to implement the functions of controlling the optical amplifiers. The controller 130 and the pump control circuits 231, 331, 431, 531, 631 may include the CPU and the program storage device.

The control program described above may be stored on any of various types of non-transitory computer-readable media and provided to a computer of the controller 130 and the pump control circuits 231, 331, 431, 531, 631. The non-transitory computer-readable media include various types of tangible storage media. The non-transitory computer-readable media may be included in the controller 130 and the pump control circuits 231, 331, 431, 531, 631.

The program may be provided to the computer using any of various types of transitory computer-readable media. Examples of the transitory computer-readable media include an electrical signal, an optical signal, and an electromagnetic wave. The transitory computer-readable medium can provide the program to the computer through a wired communication path such as an electrical cable and optical fiber, or a wireless communication path.

INDUSTRIAL APPLICABILITY

This invention can be applied to an optical communication system with several spatial channels.

REFERENCE SIGNS LIST 100, 200, 300, 400, 500, 600: Optical amplifier
280, 283, 380, 383, 480, 483, 580, 583, 683: WDM coupler 110, 281, 381, 385, 481, 581, 681: Gain medium
121 First light source
122 Second light source
130 Controller
140, 230, 330, 430, 530, 630 Temperature monitor
231, 331, 431, 531, 631 Pump control circuit
240-247, 340-34(n), 440-44(n), 540-54(n), 640-64(n) Pump laser
282: Pump stripper
284, 384, 484, 584, 684: Isolator
532, 533 LD monitor

The invention claimed is:

1. An optical amplifier, comprising:
a gain medium for amplifying a plurality of optical channels, the gain medium including a plurality of cores through which the plurality of optical channels propagate respectively and a cladding area surrounding the plurality of cores;
a monitor configured to monitor a temperature of the optical amplifier and to produce a monitoring result;
a first light source configured to emit a first light beam to excite the cladding area;
a second light source configured to emit a plurality of second light beams to excite each of the plurality of cores individually; and
a controller configured to control the first light source and the second light source based on the produced monitoring result,
wherein
the gain medium includes a first gain medium and a second gain medium;
the second gain medium is connected in series directly to the first gain medium;
the first gain medium is configured to be excited by the first light beam; and
the second gain medium is configured to be excited by the plurality of second light beams.

2. The optical amplifier according to claim 1, wherein
the second light source consists of a plurality of lasers that include thermistors in their respective package, and
the monitoring result is produced by the thermistors when the laser respective to the thermistors is not emitting light.

3. The optical amplifier according to claim 2, wherein
the second light source is cooled during operation,
an optical power of the second light source is decreased when the produced monitoring result deviates from a reference temperature, and
the optical power of the first light source is increased when the produced monitoring result deviates from a reference temperature.

4. The optical amplifier according to claim 3, wherein
the first light source is cooled during operation,
an optical power of the first light source is decreased when the produced monitoring result deviates from a reference temperature, and
the optical power of the second light source is increased when the produced monitoring result deviates from a reference temperature.

5. The optical amplifier according to claim 2, wherein
the first light source and the second light source are not cooled during operation.

6. The optical amplifier according to claim 1, wherein
the second light source is cooled during operation,
an optical power of the second light source is decreased when the produced monitoring result deviates from a reference temperature, and
an optical power of the first light source is increased when the produced monitoring result deviates from a reference temperature.

7. The optical amplifier according to claim 1, wherein
the first light source is cooled during operation,
an optical power of the first light source is decreased when the produced monitoring result deviates from a reference temperature, and
the optical power of the second light source is increased when the produced monitoring results deviate from a reference temperature.

8. The optical amplifier according to claim 1, wherein
the first light source and the second light source are not cooled during operation.

9. The optical amplifier according to claim 1, wherein
the controller includes a lookup table containing a setting value for a light source depending on the produced monitoring result.

10. The optical amplifier according to claim 1, wherein
the controller uses a calculation result of a linear interpolation depending on an absolute value of a difference of the produced monitoring result and a reference temperature.

11. The optical amplifier according to claim 1, wherein
the controller uses a calculation result of a second degree polynomial calculation depending on an absolute value of a difference of the produced monitoring result and a reference temperature.

12. A control method for amplifying optical signal of an optical amplifier, comprising:
amplifying, by a gain medium, a plurality of optical channels, the gain medium including a plurality of cores through which the plurality of optical channels to propagate respectively and a cladding area surrounding the plurality of cores;
monitoring a temperature of the optical amplifier and producing a monitoring result;
exciting the cladding area of the gain medium with a first light source;
exciting each of the plurality of cores individually with a second light source; and
controlling the first light source and the second light source based on the produced monitoring result,
wherein
the gain medium includes a first gain medium and a second gain medium;
the second gain medium is connected in series directly to the first gain medium;
the first gain medium is configured to be excited by the first light beam; and
the second gain medium is configured to be excited by the plurality of second light beams.

* * * * *